United States Patent
Ranjan et al.

(10) Patent No.: US 11,132,543 B2
(45) Date of Patent: Sep. 28, 2021

(54) UNCONSTRAINED APPEARANCE-BASED GAZE ESTIMATION

(71) Applicant: NVIDIA Corporation, Santa Clara, CA (US)

(72) Inventors: Rajeev Ranjan, College Park, MD (US); Shalini De Mello, San Francisco, CA (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 90 days.

(21) Appl. No.: 15/855,887

(22) Filed: Dec. 27, 2017

(65) Prior Publication Data

US 2018/0181809 A1    Jun. 28, 2018

Related U.S. Application Data

(60) Provisional application No. 62/439,870, filed on Dec. 28, 2016.

(51) Int. Cl.
  *G06K 9/00*   (2006.01)
  *G06K 9/62*   (2006.01)
  (Continued)

(52) U.S. Cl.
  CPC ..... *G06K 9/00604* (2013.01); *G06K 9/00228* (2013.01); *G06K 9/00255* (2013.01); *G06K 9/00617* (2013.01); *G06K 9/00973* (2013.01); *G06K 9/00986* (2013.01); *G06K 9/3216* (2013.01); *G06K 9/4628* (2013.01); *G06K 9/627* (2013.01); *G06K 9/6256* (2013.01); *G06N 3/0454* (2013.01); *G06N 3/08* (2013.01);
  (Continued)

(58) Field of Classification Search
CPC combination set(s) only.
See application file for complete search history.

(56) References Cited

U.S. PATENT DOCUMENTS

| | | | |
|---|---|---|---|
| 6,351,273 | B1 | 2/2002 | Lemelson et al. |
| 6,943,754 | B2 | 9/2005 | Aughey et al. |

(Continued)

FOREIGN PATENT DOCUMENTS

| | | |
|---|---|---|
| CN | 1423228 A | 6/2003 |
| CN | 202385184 U | 8/2012 |

(Continued)

OTHER PUBLICATIONS

Galliani et al., "Just look at the image: viewpoint-specific surface normal prediction for improved multi-view reconstruction", Apr. 2016, IEEE (Year: 2016).*

(Continued)

*Primary Examiner* — Zhiyu Lu
(74) *Attorney, Agent, or Firm* — Zilka-Kotab, P.C.

(57) ABSTRACT

A method, computer readable medium, and system are disclosed for performing unconstrained appearance-based gaze estimation. The method includes the steps of identifying an image of an eye and a head orientation associated with the image of the eye, determining an orientation for the eye by analyzing, within a convolutional neural network (CNN), the image of the eye and the head orientation associated with the image of the eye, and returning the orientation of the eye.

19 Claims, 12 Drawing Sheets

(51) Int. Cl.
    *G06T 7/11*           (2017.01)
    *G06T 7/70*           (2017.01)
    *G06N 3/04*          (2006.01)
    *G06T 7/73*           (2017.01)
    *G06K 9/32*          (2006.01)
    *G06N 3/08*          (2006.01)
    *G06K 9/46*          (2006.01)

(52) U.S. Cl.
    CPC ................... *G06T 7/11* (2017.01); *G06T 7/70* (2017.01); *G06T 7/73* (2017.01); *G06N 3/04* (2013.01); *G06T 2200/04* (2013.01); *G06T 2207/10024* (2013.01); *G06T 2207/20081* (2013.01); *G06T 2207/20084* (2013.01); *G06T 2207/30201* (2013.01); *G06T 2210/52* (2013.01)

(56) References Cited

U.S. PATENT DOCUMENTS

| | | | |
|---|---|---|---|
| 7,306,337 B2 | 12/2007 | Ji et al. | |
| 9,298,995 B2 | 3/2016 | Hanita et al. | |
| 10,204,264 B1* | 2/2019 | Gallagher | H04N 21/44218 |
| 2007/0236513 A1* | 10/2007 | Hedenstroem | G06T 11/60 345/634 |
| 2015/0178554 A1* | 6/2015 | Kanaujia | G06T 19/20 382/118 |
| 2017/0032222 A1* | 2/2017 | Sharma | G06K 9/4619 |
| 2017/0061251 A1* | 3/2017 | Fan | G06K 9/6267 |
| 2017/0169620 A1* | 6/2017 | Bleiweiss | G06F 17/50 |
| 2017/0236252 A1* | 8/2017 | Nguyen | H04N 13/383 345/419 |
| 2018/0157320 A1* | 6/2018 | Trail | G06F 3/011 |
| 2018/0158246 A1* | 6/2018 | Grau | G06T 3/0093 |
| 2018/0259608 A1* | 9/2018 | Golden | G06N 3/084 |

FOREIGN PATENT DOCUMENTS

| | | |
|---|---|---|
| CN | 104224204 A | 12/2014 |
| CN | 106815604 A | 6/2017 |
| CN | 106909220 A | 6/2017 |
| KR | 20160096271 A | 8/2016 |
| WO | 1999026126 A1 | 5/1999 |

OTHER PUBLICATIONS

Zhang et al., "Appearance-Based Gaze Estimation in the Wild", Apr. 2015 (Year: 2015).*
Kim et al., "Convolutional Neural Network Architectures for Gaze Estimation on Mobile Devices," Stanford University, 2017, 7 pages, retrieved from http://cs231n.stanford.edu/reports/2017/pdfs/229.pdf.
Jerry et al., "Convolutional Neural Networks for Eye Detection in Remote Gaze Estimation Systems," Proceedings of the International MultiConference of Engineers and Computer Scientists, vol. 1, Mar. 2008, pp. 1-6.
Baluja et al., "Non-Intrusive Gaze Tracking Using Artificial Neural Networks," School of Computer Science, Jan. 5, 1994, pp. 1-14.
Back, D., "Neural Network Gaze Tracking using Web Camera," Dec. 16, 2005, 73 pages.
Shrivastava et al., "Learning from Simulated and Unsupervised Images through Adversarial Training," Computer Vision Foundation, IEEE Xplore, 2016, pp. 2107-2116.
Arxiv, "Virtual Eyes Train Deep Learning Algorithm to Recognize Gaze Direction," MIT Technology Review, May 29, 2015, pp. 1-6 retrieved from https://www.technologyreview.com/s/537891/virtual-eyes-train-deep-learning-algorithm-to-recognize-gaze-direction/.
Mora et al., "Geometric Generative Gaze Estimation (G3E) for Remote RGB-D Cameras," Proceedings of the IEEE Conference on Computer Vision and Pattern Recognition, 2014, pp. 1-8.
Chuang et al., "Estimating Gaze Direction of Vehicle Drivers Using a Smartphone Camera," Proceedings of the IEEE Conference on Computer Vision and Pattern Recognition Workshops, 2014, pp. 165-170.
Hansen et al., "In the Eye of the Beholder: A Survey of Models for Eyes and Gaze," IEEE Transactions on Pattern Analysis and Machine Intelligence, vol. 32, No. 03, Mar. 2010, pp. 478-500.
He et al., "Deep Residual Learning for Image Recognition," Proceedings of the IEEE Conference on Computer Vision and Pattern Recognition, 2015, pp. 1-9.
Huang et al., "Tabletgaze: Unconstrained Appearance-Based Gaze Estimation in Mobile Tablets," IEEE, 2015, pp. 1-13.
Krafka et al., "Eye Tracking for Everyone," Proceedings of the IEEE Conference on Computer Vision and Pattern Recognition, 2016, pp. 1-9.
Krizhevsky et al., "Imagenet classification with deep convolutional neural networks," Advances in Neural Information Processing Systems, 2012, pp. 1-9.
Lecun et al., "Comparison of Learning Algorithms for Handwritten Digit Recognition," International Conference on Artificial Neural Networks, vol. 60, pp. 1-10.
Lepetit et al., "EPnP: An accurate O(n) Solution to the PnP Problem," International Journal of Computer Vision, 2008, pp. 1-12.
Mora et al., "Gaze Estimation from Multimodal Kinect Data," Computer Vision and Pattern Recognition Workshops (CVPRW), 2012, pp. 4321-4326.
Ranjan et al., "An All-In-One Convolutional Neural Network for Face Analysis," arXiv preprint arXiv:1611.00851, 2016, pp. 1-9.
Ren et al., "Faster R-CNN: Towards Real-Time Object Detection with Region Proposal Networks," Advances in Neural Information Processing Systems, 2015, pp. 1-9.
Srivastava et al., "Highway Networks," Presented at the Deep Learning Workshop, International Conference on Machine Learning, 2015, pp. 1-6.
Su et al., "Render for CNN: Viewpoint Estimation in Images Using CNNs Trained with Rendered 3D Model Views," IEEE International Conference on Computer Vision, 2015, pp. 2686-2694.
Wood et al., "A 3D morphable eye region model for gaze estimation," European Conference on Computer Vision, 2016, pp. 1-17.
Wood et al., "Learning an appearance-based gaze estimator from one million synthesised images," Proceedings of the Ninth Biennial ACM Symposium on Eye Tracking Research & Applications, 2016, pp. 1-8.
Wood et al., "Rendering of Eyes for Eye-Shape Registration and Gaze Estimation," Proceedings of the IEEE International Conference on Computer Vision, 2015, pp. 1-9.
Zeiler et al., "Visualizing and Understanding Convolutional Networks," European conference on computer vision, 2014, pp. 818-833.
Zhang et al., "Appearance Based Gaze Estimation in the Wild," Proceedings of the IEEE Conference on Computer Vision and Pattern Recognition, 2015, pp. 1-10.
Zhang et al., "It's Written All Over Your Face: Full-face Appearance-Based Gaze Estimation," arXiv preprint arXiv:1611.08860, 2016, pp. 1-10.
Guestrin et al., "General Theory of Remote Gaze Estimation Using the Pupil Center and Corneal Reflections," IEEE Transactions on Biomedical Engineering, vol. 53, No. 6, 2006, pp. 1124-1133.
Lu et al., "Adaptive Linear Regression for Appearance-Based Gaze Estimation," IEEE Transactions on Pattern Analysis and Machine Intelligence, vol. 36, No. 10, Oct. 2014, pp. 2033-2046.
Smith et al., "Gaze Locking: Passive Eye Contact Detection for Human-Object Interaction," Proceedings of the 26th Annual ACM Symposium on User Interface Software and Technology, Oct. 2013, pp. 271-280.
Sugano et al., "Learning-by-Synthesis for Appearance-based 3D gaze Estimation," Proceedings of the IEEE Conference on Computer Vision and Pattern Recognition, 2014, pp. 1-8.
Wang et al., "Appearance-based gaze estimation using deep features and random forest regression," Knowledge-Based Systems, vol. 110, Oct. 2016, pp. 293-301.

(56) References Cited

OTHER PUBLICATIONS

Asteriadis et al., "Visual Focus of Attention in Non-calibrated Environments using Gaze Estimation," International Journal of Computer Vision, vol. 107, No. 3, May 2014, pp. 293-316.

* cited by examiner

UNCONSTRAINED APPEARANCE-BASED GAZE ESTIMATION

CLAIM OF PRIORITY

This application claims the benefit of U.S. Provisional Application No. 62/439,870 (Attorney Docket No. NVIDP1152+/16SC0270US01) titled "UNCONSTRAINED APPEARANCE-BASED OCULAR INFERENCE," filed Dec. 28, 2016, the entire contents of which is incorporated herein by reference.

FIELD OF THE INVENTION

The present invention relates to user monitoring, and more particularly to performing gaze tracking using a convolutional neural network (CNN).

BACKGROUND

Current technology for tracking a person's gaze (i.e., line of sight) using cameras typically requires extensive calibration. Furthermore, high-quality image sensors are required to produce accurate results, and the results may also require proper lighting conditions. There is a desire to create a high-quality gaze estimation system with consumer-grade image sensors that are widely used in today's inexpensive consumer electronic devices.

Thus, there is a need for addressing these issues and/or other issues associated with the prior art.

SUMMARY

A method, computer readable medium, and system are disclosed for performing unconstrained appearance-based gaze estimation. The method includes the steps of identifying an image of an eye and a head orientation associated with the image of the eye, determining an orientation for the eye by analyzing, within a convolutional neural network (CNN), the image of the eye and the head orientation associated with the image of the eye, and returning the orientation of the eye.

DETAILED DESCRIPTION

Figure 1:
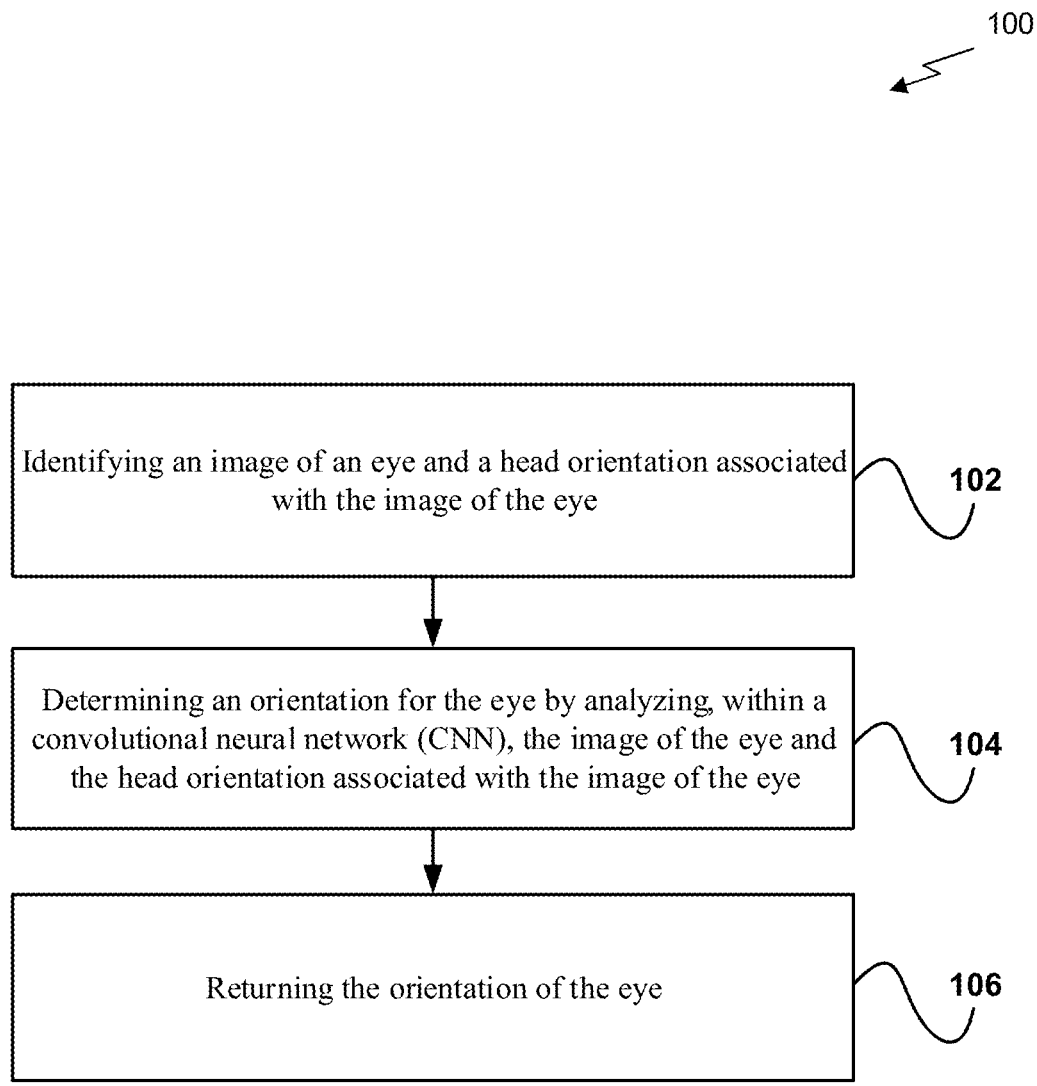
FIG. 1 illustrates a flowchart of a method for performing unconstrained appearance-based gaze estimation, in accordance with one embodiment.

FIG. 1 illustrates a flowchart of a method 100 for performing unconstrained appearance-based gaze estimation, in accordance with one embodiment. As shown in operation 102, an image of an eye and a head orientation associated with the image of the eye are identified. In one embodiment, the eye may include an eye of a subject (e.g., a human or other animal, etc.). In another embodiment, the image of the eye may be obtained from an image of a face of the subject. For example, a general image including a face of a subject may be identified utilizing one or more cameras. In another example, a face image may be identified and isolated within the general image (e.g., within a head of a subject, etc.) utilizing one or more applications.

In yet another example, a location of one or more eyes may be determined within the face image. For instance, the location of the one or more eyes may be performed by determining a location of a center of the one or more eyes within the face image. The center may include X and Y coordinates within the face image, and the center may be used to crop the face image around the location of the one or more eyes. This may result in one or more cropped images that include an eye within the face image and an area surrounding the eye (e.g., where the area is a cropped area smaller than the face image itself).

Additionally, in one embodiment, the image of the face may be obtained utilizing one or more cameras (e.g., one or more web cameras, mobile device cameras, streaming cameras, etc.). In another embodiment, the image of the face may be obtained using ambient light (e.g., natural light such as light from the sun, light illuminating a room, etc.). In yet another embodiment, the image of the face may be obtained using infrared light (e.g., IR illumination, etc.). In still another embodiment, the image of the face may be obtained without performing any calibration operations.

Further, in one embodiment, the head orientation associated with the image of the eye may include an orientation of a face and/or head of the subject with respect to a camera. In another embodiment, the head orientation may be calculated by performing a head pose estimation. For example, a face image may be identified and isolated within a general image. In another example, the face image may be located on a head of the subject within the general image. In yet another example, utilizing the face image, an orientation of the face and/or head with respect to a camera may be determined. For instance, the head orientation may include a 3D rotation (e.g., a yaw, pitch, and roll) of the face relative to a camera axis, a camera plane, etc.

Further still, in one embodiment, the face image may be normalized. For example, the face image may be rotated to correct roll relative to the camera plane. In another example, the correction may be performed by normalizing an orientation vector to correct for roll. This may remove the effect of roll within the face image (e.g., by straightening a head on which the face is located, which may make the face image and eyes straight, etc.). In another embodiment, the image of the eye may be obtained from the normalized face image.

Also, in one embodiment, the head orientation associated with the image of the eye may include an azimuth value (e.g., representing a yaw rotation, etc.) and an elevation value (e.g., representing a pitch rotation, etc.) of the normalized face image. In another embodiment, the head orientation may be in the form of a vector.

In addition, as shown in operation 104, an orientation for the eye is determined by analyzing the image of the eye and the head orientation associated with the image of the eye within a convolutional neural network (CNN). In one embodiment, the orientation for the eye may include an orientation of the eye with respect to the camera or with respect to the head. For example, the camera may be the same camera for which the head orientation associated with the image of the eye is determined. In another example, the orientation of the eye may include a gaze angle with respect to the camera or with respect to the head. In yet another example, the orientation of the eye may include an azimuth value (e.g., representing a yaw rotation, etc.) and an elevation value (e.g., representing a pitch rotation, etc.) of the eye. In still another example, the orientation of the eye may be in the form of a vector.

Furthermore, in one embodiment, the CNN may include a plurality of convolution layers, a pooling layer, a fully-connected layer, and one or more additional fully-connected layers, where each additional fully-connected layer may be associated with a head orientation cluster. In another embodiment, the CNN may implement one or more skip connections. For example, a skip layer may be implemented within the CNN that may allow a bypassing of one or more layers during data transfer. This may allow lower layers within the CNN to access features in higher resolution located at higher layers within the CNN.

Further still, in one embodiment, the CNN may implement branching. For example, the CNN may include a plurality of different branch layers. In another example, each of the plurality of branch layers may be associated with a different predetermined grouping of head poses. In yet another example, the head orientation associated with the image of the eye may be classified into one of the predetermined groupings of head poses. The resulting grouping classification may dictate the branch layer of the CNN that is used within the CNN to determine the orientation of the eye. This may improve an accuracy of the determined orientation for the eye.

Also, in one embodiment, the CNN may be pre-trained. For example, the CNN may be trained with images that are given corresponding weights. In another example, the CNN may be initialized with weights from a related task during the pre-training (e.g., instead of using random values, etc.). In yet another example, a level of similarity may be determined between the current task (e.g., the determination of the orientation of the eye) and other tasks previously performed utilizing the CNN. The previous task having the highest level of similarity may be selected to provide weights to the CNN during the pre-training for the current task.

Additionally, in one embodiment, the CNN may be trained using synthetic (e.g., rendered) data. For example, 3D rendered graphical data may be used as a data set input to train the CNN. In another example, the rendered data may have the same distribution as real data used during the training. For instance, the real data may include non-synthetic images of real eyes (e.g., not 3D rendered eyes). This may increase an accuracy of the trained CNN.

Further, in one embodiment, the CNN may be trained using a training dataset that includes rendered images and real images. For example, each rendered image in the rendered images included in the training dataset may include a representation of a subject's head having a particular head orientation and gaze direction. In another example, the rendered images may be associated with a range of subjects, head orientations, gaze directions, simulated lighting conditions, etc.

Further still, in one embodiment, the CNN may be trained in a predetermined order. For example, the CNN may first be initialized with one or more weights. The CNN may then be trained using the synthetic data, and may next be trained with real data. This may increase an accuracy of the trained CNN. In another embodiment, the rendered images may be used in a pre-training phase to implement a coarse adjustment of network parameters for the CNN, and the real images may be used in a training phase to implement a fine adjustment of the network parameters for the CNN.

Also, in one embodiment, additional information may be provided with the synthetic data. For example, fiducial point estimation may be performed by annotating one or more points (e.g., pixels, etc.) within the rendered data. For instance, one or more points within the rendered data may be labeled as "lower eyelid," "upper eyelid," "iris," "pupil," etc. The CNN may then produce a list of spatial coordinates (e.g., X and Y coordinates, etc.) for each point within the rendered image.

In another embodiment, image segmentation may be performed by segmenting the rendered data into one or more regions. For example, the rendered data may be segmented into a plurality of different classes. The CNN may then produce a classification for each point within the image. In yet another embodiment, the CNN may be implemented in a distributed computing environment (e.g., a cloud computing environment, etc.).

In addition, as shown in operation 106, the orientation of the eye is returned. In one embodiment, the orientation of the eye may be returned to one or more applications (e.g., a virtual reality (VR) foveated rendering application, etc.). For example, the foveated rendering application may adjust a level of rendering within a scene, based on the orientation of the eye. In another example, the foveated rendering may be implemented within a display of an automobile (e.g., a touchscreen display, a heads-up display, etc.).

In another embodiment, the orientation of the eye may be used to monitor a driver of a vehicle. In yet another embodiment, the orientation of the eye may be used to perform gaze correction during video conferencing. In still another embodiment, the orientation of the eye may be used to animate one or more elements of a video game (e.g., an avatar, etc.).

In this way, unconstrained gaze tracking may be performed, where gaze tracking is performed within an unconstrained environment, and with unconstrained head movement by the subject. Additionally, subject and/or session calibration may be avoided during gaze tracking.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
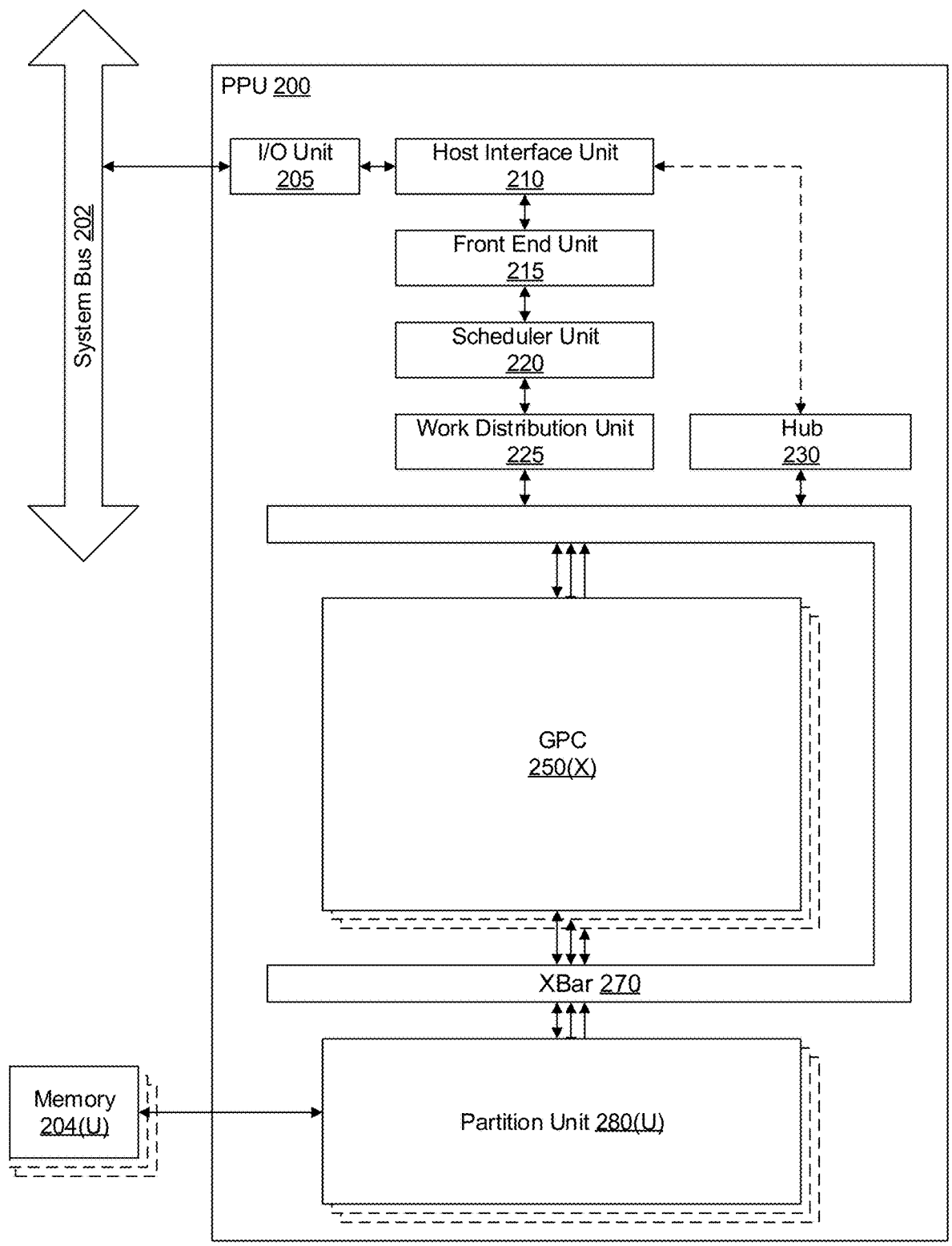
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIe bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 provides the front end unit 215 with pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In one embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 are coupled to the host unit 210. The other units may also be connected to the XBar 270 via a hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. In one embodiment, the PPU 200 includes a number U of partition units 280 that is equal to the number of separate and distinct memory devices 204 coupled to the PPU 200. A partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same group of threads may exchange data through shared memory. In one embodiment, a group of threads comprises 32 related threads.

Figure 3A:
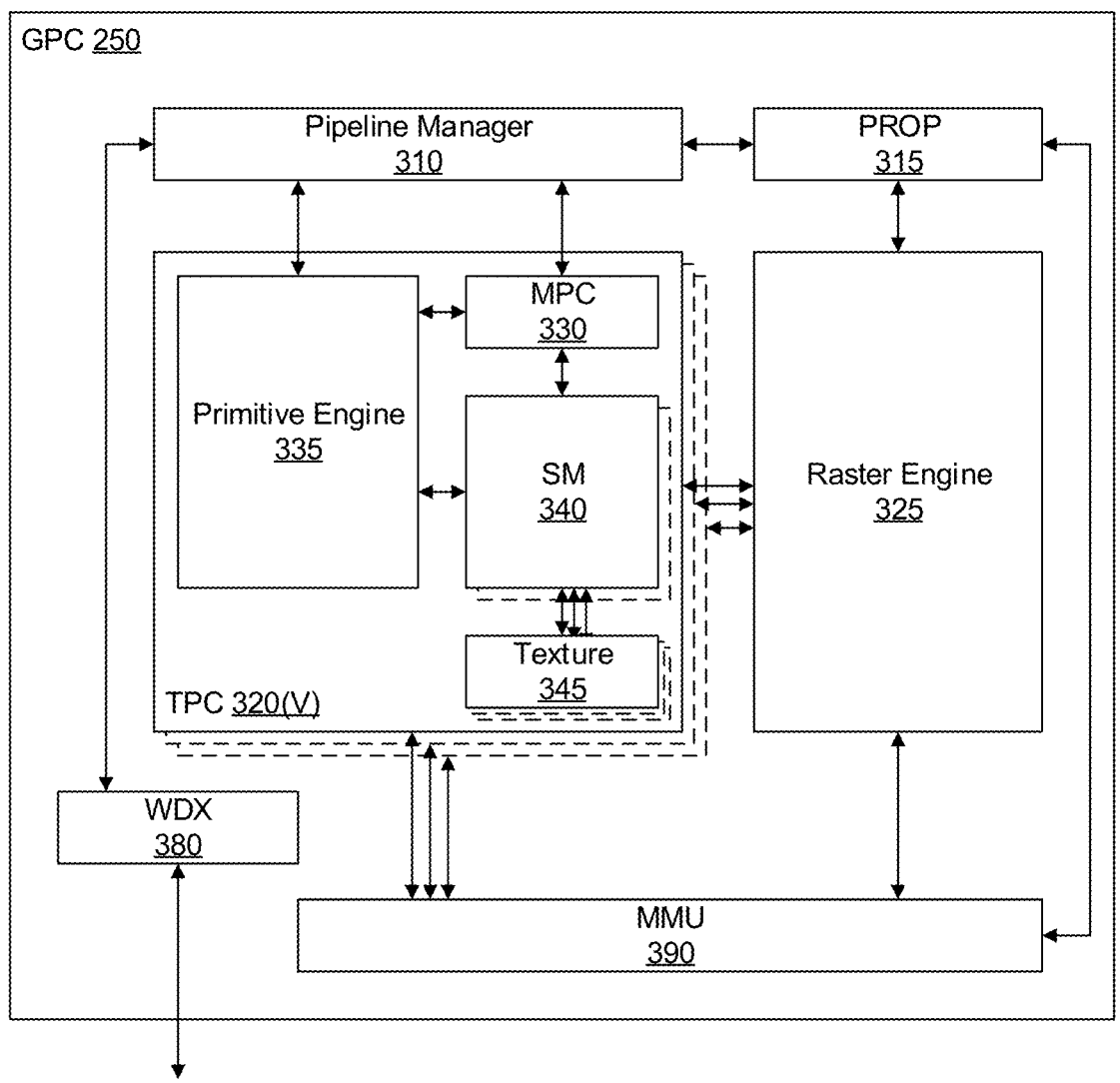
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a course raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine may be transmitted to the culling engine where fragments associated with the primitive that fail a z-test are culled, and transmitted to a clipping engine where fragments lying outside a viewing frustum are clipped. Those fragments that survive clipping and culling may be passed to a fine raster engine to generate attributes for the pixel fragments based on the plane equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, one or more SMs 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). The texture unit 345 is also used as the Load/Store path for SM 340 to MMU 390. In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
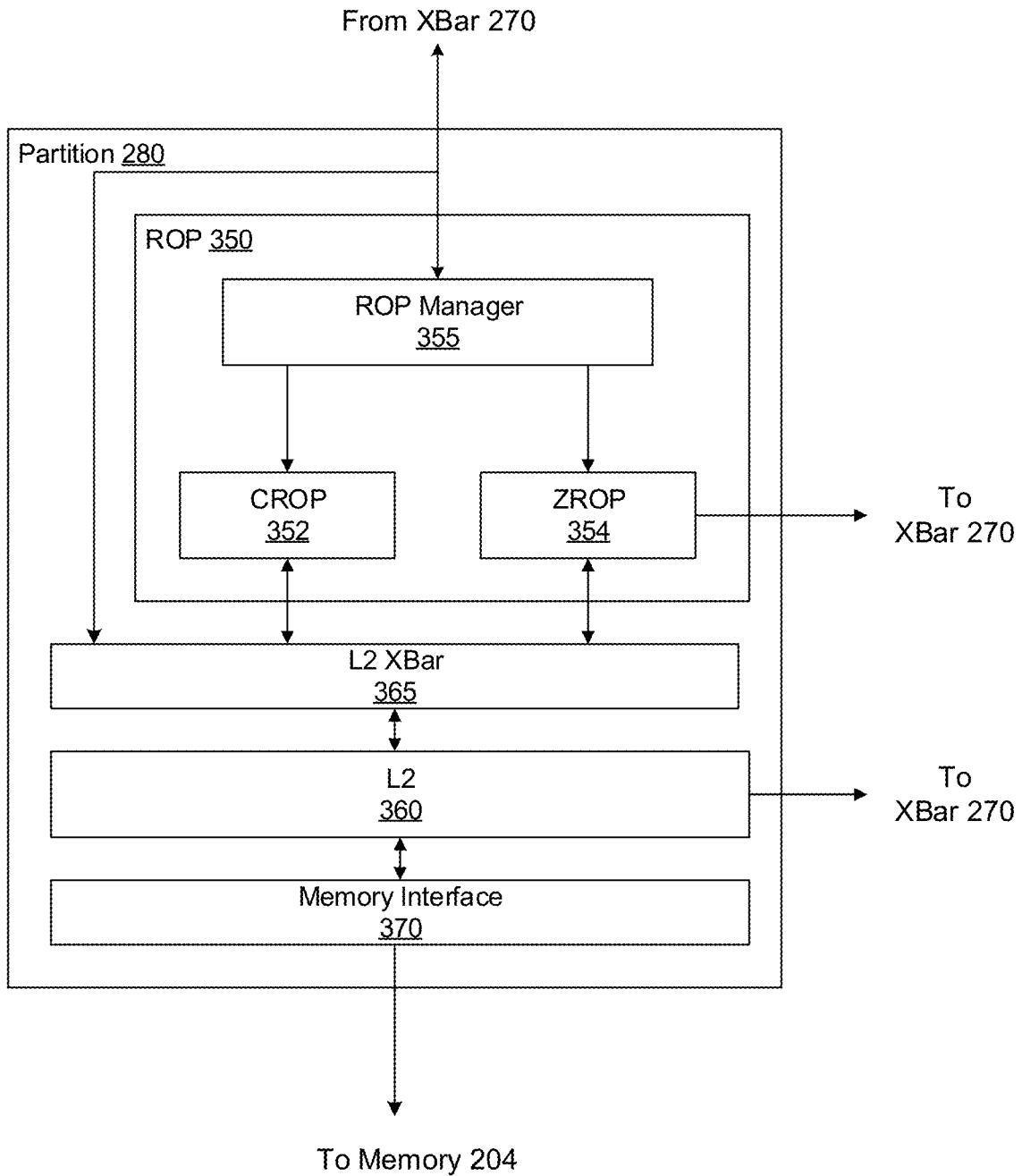
FIG. 3B illustrates a partition unit of the parallel processing unit of FIG. 2, in accordance with one embodiment.

FIG. 3B illustrates a partition unit 280 of the PPU 200 of FIG. 2, in accordance with one embodiment. As shown in FIG. 3B, the partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per partition unit 280, where each partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 8.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
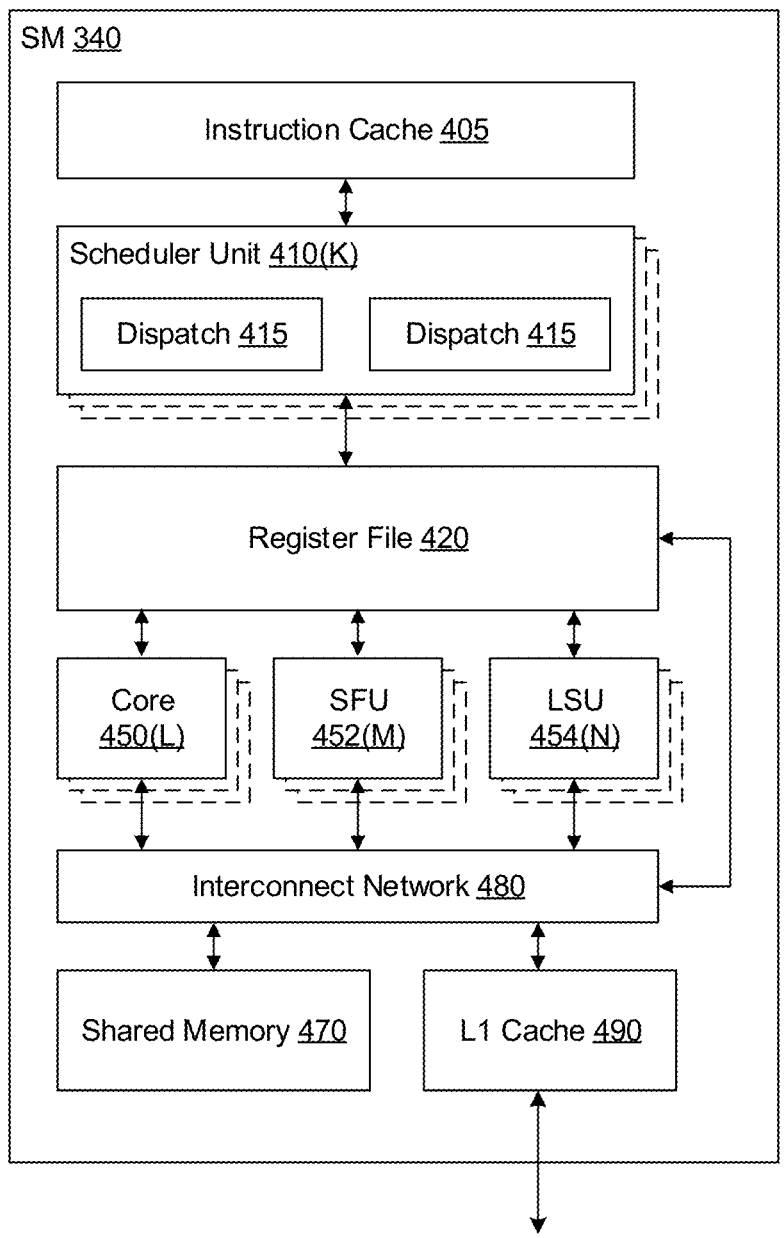
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, a shared memory 470 and an L1 cache 490.

As described above, the work distribution unit 225 dispatches tasks for execution on the GPCs 250 of the PPU 200. The tasks are allocated to a particular TPC 320 within a GPC 250 and, if the task is associated with a shader program, the task may be allocated to an SM 340. The scheduler unit 410 receives the tasks from the work distribution unit 225 and manages instruction scheduling for one or more groups of threads (i.e., warps) assigned to the SM 340. The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In one embodiment, the SM 340 includes a large number (e.g., 128, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 that perform special functions (e.g., attribute evaluation, reciprocal square root, and the like), and N LSUs 454 that implement load and store operations between the shared memory 470 or L1 cache 490 and the register file 420. In one embodiment, the SM 340 includes 128 cores 450, 32 SFUs 452, and 32 LSUs 454.

Each SM 340 includes an interconnect network 480 that connects each of the functional units to the register file 420 and the LSU 454 to the register file 420, shared memory 470 and L1 cache 490. In one embodiment, the interconnect network 480 is a crossbar that can be configured to connect any of the functional units to any of the registers in the register file 420 and connect the LSUs 454 to the register file and memory locations in shared memory 470 and L1 cache 490.

The shared memory 470 is an array of on-chip memory that allows for data storage and communication between the SM 340 and the primitive engine 335 and between threads in the SM 340. In one embodiment, the shared memory 470 comprises 64 KB of storage capacity. An L1 cache 490 is in the path from the SM 340 to the partition unit 280. The L1 cache 490 can be used to cache reads and writes. In one embodiment, the L1 cache 490 comprises 24 KB of storage capacity.

The PPU 200 described above may be configured to perform highly parallel computations much faster than conventional CPUs. Parallel computing has advantages in graphics processing, data compression, biometrics, stream processing algorithms, and the like.

When configured for general purpose parallel computation, a simpler configuration can be used. In this model, as shown in FIG. 2, fixed function graphics processing units are bypassed, creating a much simpler programming model. In this configuration, the Work Distribution Unit 225 assigns and distributes blocks of threads directly to the TPCs 320. The threads in a block execute the same program, using a unique thread ID in the calculation to ensure each thread generates unique results, using the SM 340 to execute the program and perform calculations, shared memory 470 communicate between threads, and the LSU 454 to read and write Global memory through partition L1 cache 490 and partition unit 280.

When configured for general purpose parallel computation, the SM 340 can also write commands that scheduler unit 220 can use to launch new work on the TPCs 320.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Figure 5:
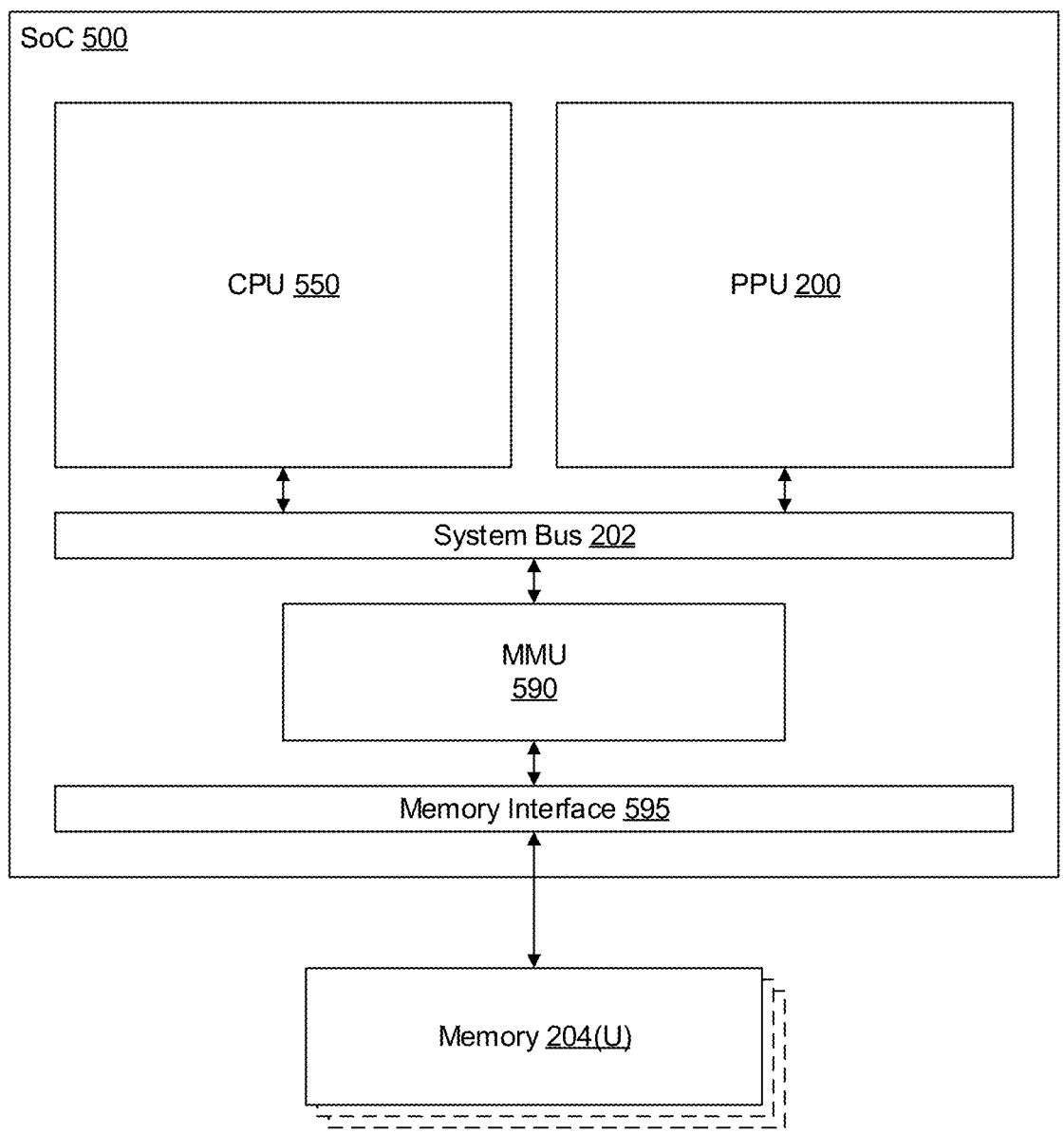
FIG. 5 illustrates a system-on-chip including the parallel processing unit of FIG. 2, in accordance with one embodiment.

FIG. 5 illustrates a System-on-Chip (SoC) 500 including the PPU 200 of FIG. 2, in accordance with one embodiment. As shown in FIG. 5, the SoC 500 includes a CPU 550 and a PPU 200, as described above. The SoC 500 may also include a system bus 202 to enable communication between the various components of the SoC 500. Memory requests generated by the CPU 550 and the PPU 200 may be routed through a system MMU 590 that is shared by multiple components of the SoC 500. The SoC 500 may also include a memory interface 595 that is coupled to one or more memory devices 204. The memory interface 595 may implement, e.g., a DRAM interface.

Although not shown explicitly, the SoC 500 may include other components in addition to the components shown in FIG. 5. For example, the SoC 500 may include multiple PPUs 200 (e.g., four PPUs 200), a video encoder/decoder, and a wireless broadband transceiver as well as other components. In one embodiment, the SoC 500 may be included with the memory 204 in a package-on-package (PoP) configuration.

Figure 6:
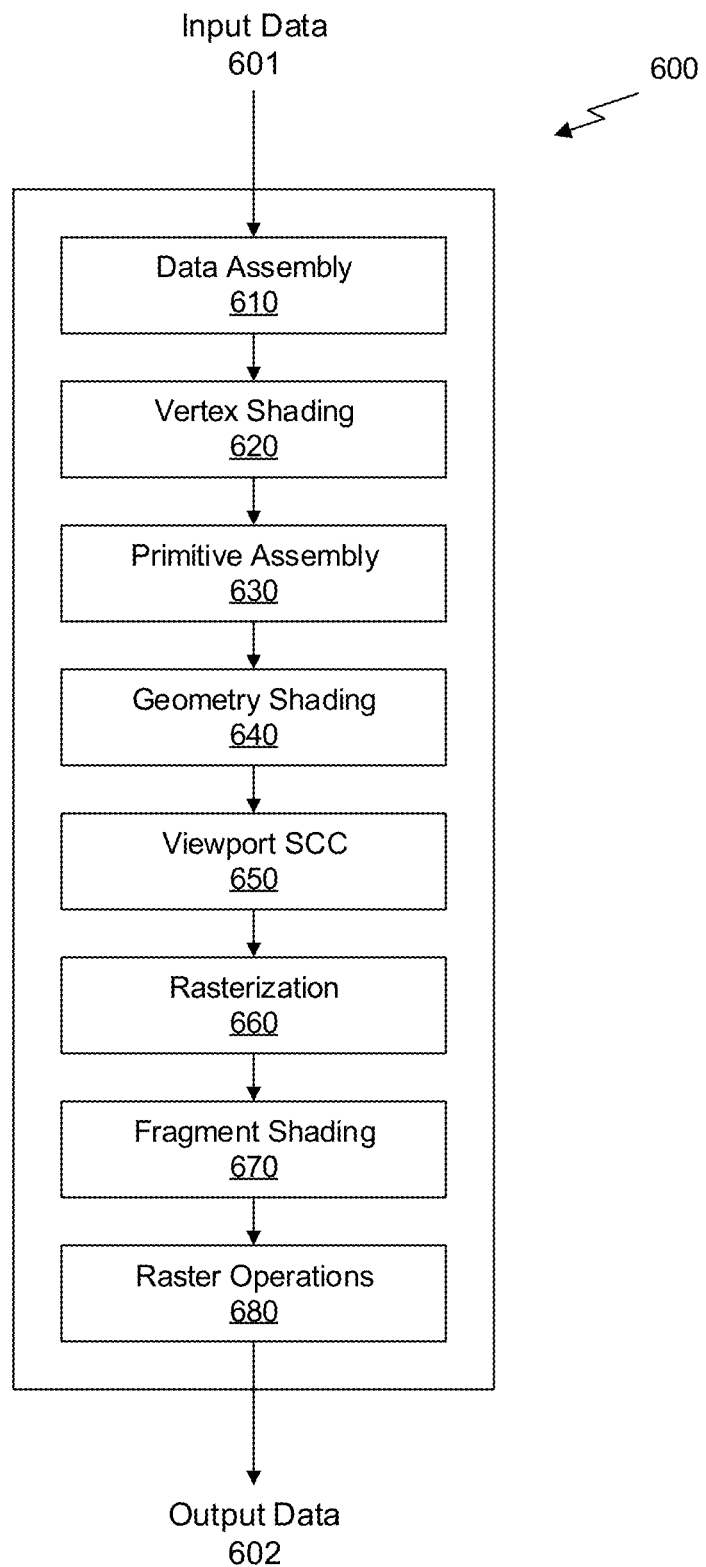
FIG. 6 is a conceptual diagram of a graphics processing pipeline implemented by the parallel processing unit of FIG. 2, in accordance with one embodiment.

FIG. 6 is a conceptual diagram of a graphics processing pipeline 600 implemented by the PPU 200 of FIG. 2, in accordance with one embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In one embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In one embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In one embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in one embodiment, the viewport SCC stage 650 may utilize the data. In one embodiment, primitive data processed by one or more of the stages in the graphics processing pipeline 600 may be written to a cache (e.g. L1 cache, a vertex cache, etc.). In this case, in one embodiment, the viewport SCC stage 650 may access the data in the cache. In one embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In one embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 200. Other stages of the graphics processing pipeline 600 may be implemented by programmable hardware units such as the SM 340 of the PPU 200.

The graphics processing pipeline 600 may be implemented via an application executed by a host processor, such as a CPU 550. In one embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU 550. In other instances, the device driver may perform operations, at least in part, by launching operations on the PPU 200 utilizing an input/output interface between the CPU 550 and the PPU 200. In one embodiment, the device driver is configured to implement the graphics processing pipeline 600 utilizing the hardware of the PPU 200.

Various programs may be executed within the PPU 200 in order to implement the various stages of the graphics processing pipeline 600. For example, the device driver may launch a kernel on the PPU 200 to perform the vertex shading stage 620 on one SM 340 (or multiple SMs 340). The device driver (or the initial kernel executed by the PPU 200) may also launch other kernels on the PPU 200 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 200. It will be appreciated that results from one kernel may be processed by one or more intervening fixed function hardware units before being processed by a subsequent kernel on an SM 340.

Figure 7:
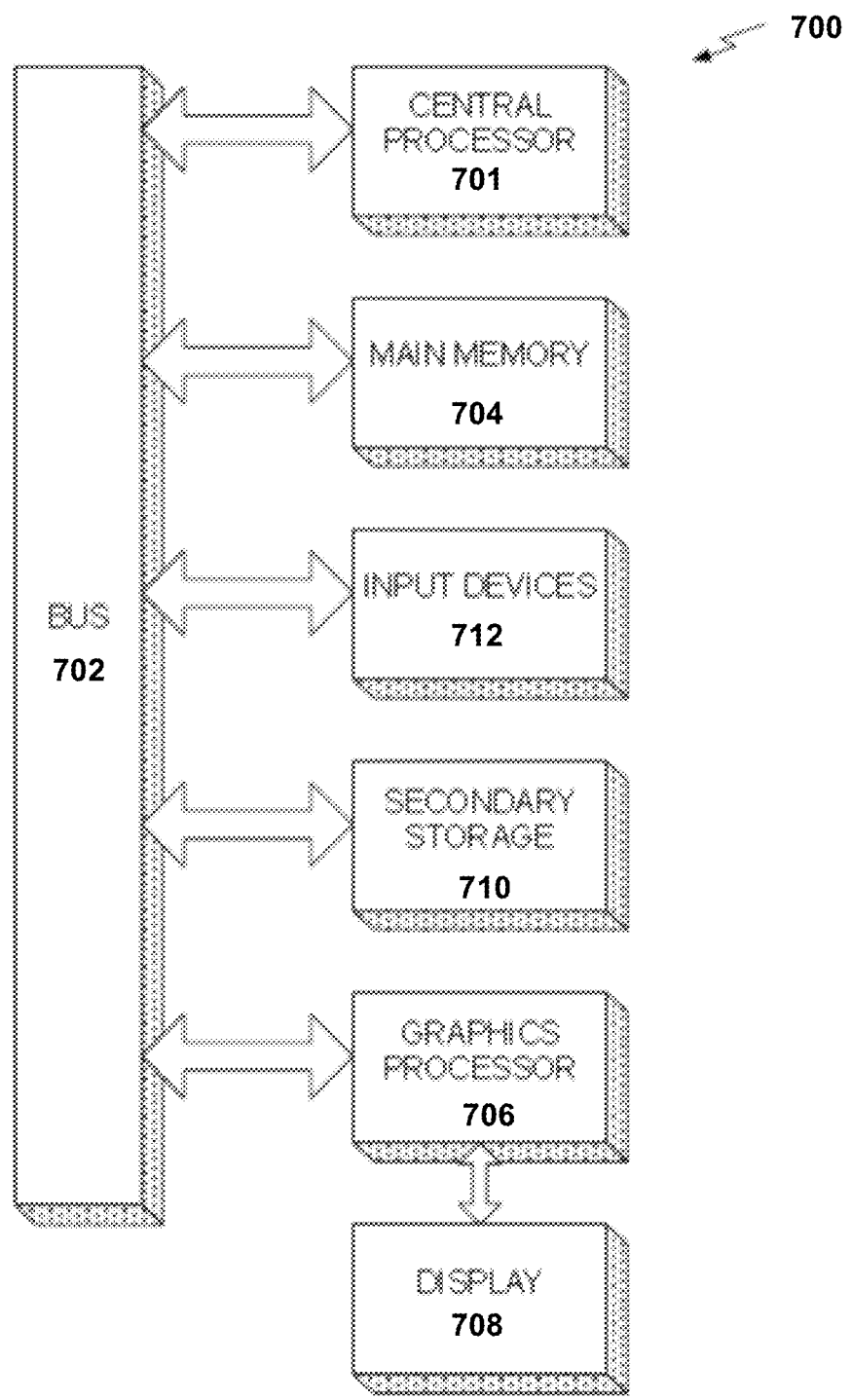
FIG. 7 illustrates an exemplary system in which the various architecture and/or functionality of all embodiments may be implemented.

FIG. 7 illustrates an exemplary system 700 in which the various architecture and/or functionality of the various previous embodiments may be implemented. As shown, a system 700 is provided including at least one central processor 701 that is connected to a communication bus 702. The communication bus 702 may be implemented using any suitable protocol, such as PCI (Peripheral Component Interconnect), PCI-Express, AGP (Accelerated Graphics Port), HyperTransport, or any other bus or point-to-point communication protocol(s). The system 700 also includes a main memory 704. Control logic (software) and data are stored in the main memory 704 which may take the form of random access memory (RAM).

The system 700 also includes input devices 712, a graphics processor 706, and a display 708, i.e. a conventional CRT (cathode ray tube), LCD (liquid crystal display), LED (light emitting diode), plasma display or the like. User input may be received from the input devices 712, e.g., keyboard, mouse, touchpad, microphone, and the like. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 704 and/or the secondary storage 710. Such computer programs, when executed, enable the system 700 to perform various functions. The memory 704, the storage 710, and/or any other storage are possible examples of computer-readable media.

In one embodiment, the architecture and/or functionality of the various previous figures may be implemented in the context of the central processor 701, the graphics processor 706, an integrated circuit (not shown) that is capable of at least a portion of the capabilities of both the central processor 701 and the graphics processor 706, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, server, workstation, game consoles, embedded system, and/or any other type of logic. Still yet, the system 700 may take the form of various other devices including, but not limited to a personal digital assistant (PDA) device, a mobile phone device, a television, etc.

Further, while not shown, the system 700 may be coupled to a network (e.g., a telecommunications network, local area network (LAN), wireless network, wide area network (WAN) such as the Internet, peer-to-peer network, cable network, or the like) for communication purposes.

Pose-Invariant Appearance-Based Gaze Estimation Aided by Synthetic Data

Exemplary Overview

Figure 8:
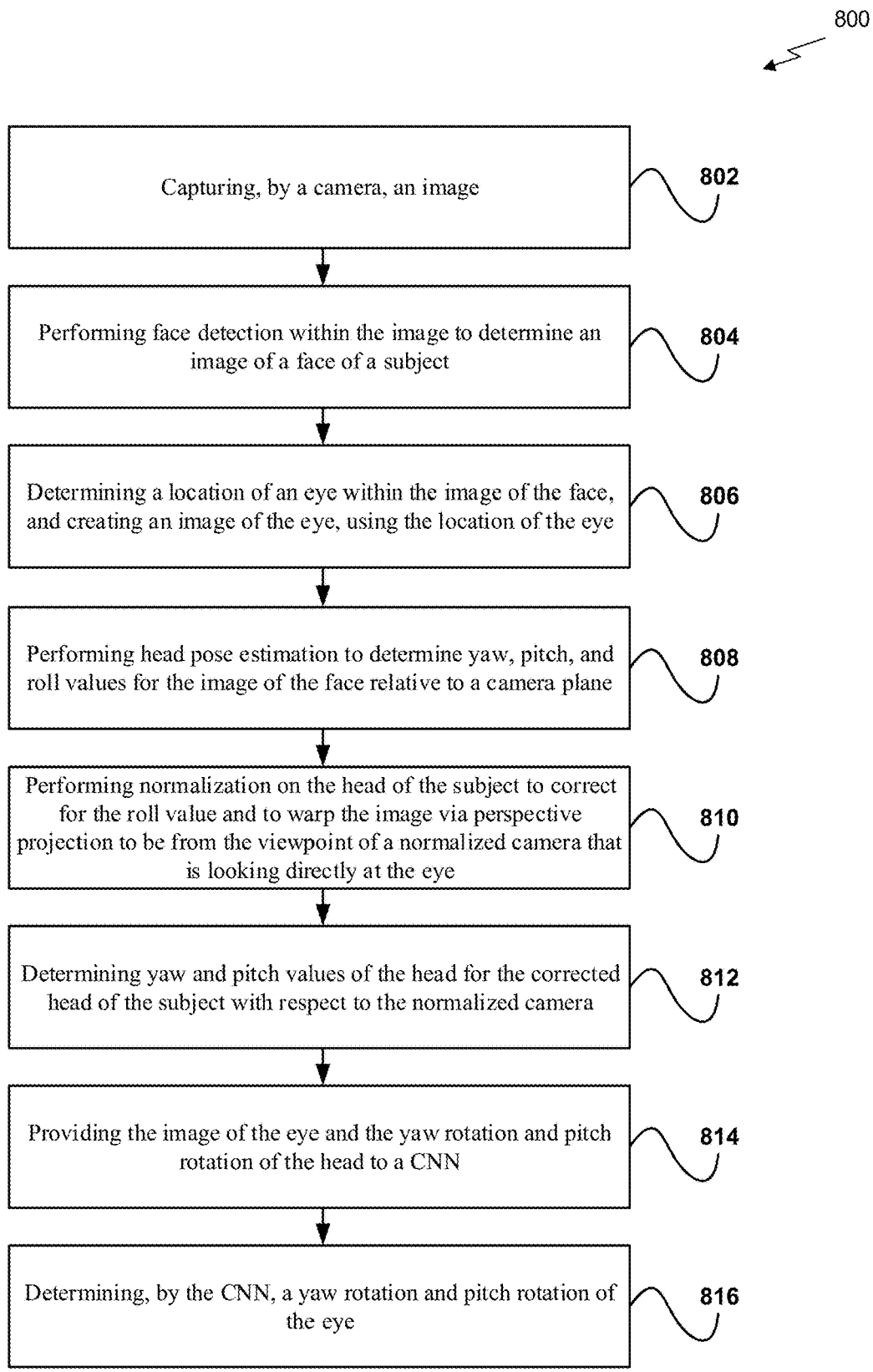
FIG. 8 illustrates a flowchart of a method for preparing data for input into a CNN, in accordance with one embodiment.

FIG. 8 illustrates a flowchart of a method 800 for preparing data for input into a CNN, in accordance with one embodiment. As shown in operation 802, an image is captured by a camera. Additionally, as shown in operation 804, face detection is performed within the image to determine an image of a face of a subject. Further, as shown in operation 806, a location of an eye is determined within the image of the face, and the location of the eye is used to create an image of the eye. For example, the image of the eye may be created by cropping a predetermined patch around the eye within the image of the face to create the image of the eye.

Also, as shown in operation 808, a head pose estimation is performed to determine yaw, pitch, and roll values for the image of the face relative to a camera plane. In addition, as shown in operation 810, normalization is performed on the head of the subject to correct for the roll value and to warp the image via perspective projection to be from the viewpoint of a normalized camera that is looking directly at the eye. Furthermore, as shown in operation 812, yaw and pitch values of the head with respect to the normalized camera are determined for the corrected head of the subject. Further still, as shown in operation 814, the image of the eye and the yaw rotation and pitch rotation of the head are provided to a CNN. Also, as shown in operation 816, the CNN determines a yaw rotation and pitch rotation of the eye.

Introduction

Remote gaze estimation has generated a great deal of interest in the research community and in the industry. It has numerous applications, including the design of industrial and web interfaces, enhancing automotive safety by monitoring the visual behavior of drivers, designing gaze-controlled computer interfaces for increased accessibility, correcting gaze direction during video conferencing, rendering foveated displays in the bandwidth-constrained environments of augmented and virtual reality headsets, etc.

In one embodiment, a CNN-based classifier architecture for accurate appearance-based gaze estimation may take an image of the eye and head pose as input. This may include a head-pose dependent CNN architecture with skip connections, which improves the accuracy of gaze-estimation. In another embodiment, a synthetic dataset may be provided, and a methodology of pre-training with synthetic data and fine-tuning on real-world data to improve the accuracy of appearance-based gaze estimation on the latter may be provided.

Additionally, in one embodiment, a pose-dependent CNN architecture with bifurcated fully-connected layers and skip connections may be implemented, which may result in improved accuracy for gaze estimation. The CNN may be fine-tuned using a model previously trained for general object viewpoint estimation. Further, a high-quality synthetic gaze dataset may be created, and a new methodology of pre-training and fine-tuning CNNs with the dataset may be implemented to improve the accuracy of gaze estimation on real-world datasets.

Further, in one embodiment, a convolutional neural network (CNN) may be used to estimate a person's gaze direction based on an image captured with a simple image sensor. In another embodiment, a gaze tracking system may be implemented that captures an image of a user's face using conventional consumer-grade image sensors and ambient light. The gaze tracking system may also utilize a CNN to analyze captured image data. The CNN may be configured, based on design and training, to generate an estimated gaze vector based on the captured image data and a head orientation vector provided to the CNN as input.

General Architecture

Figure 9:
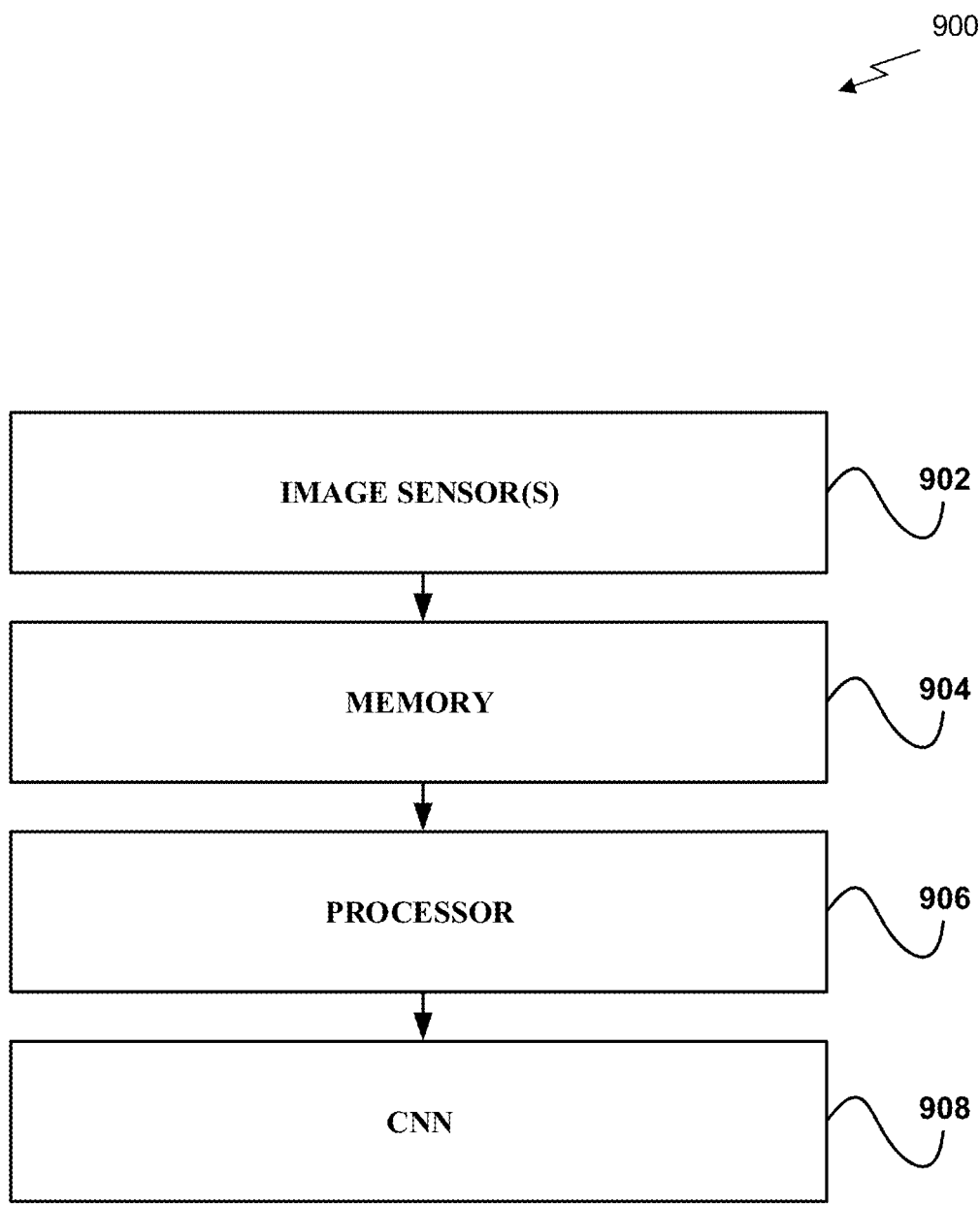
FIG. 9 illustrates an exemplary system for gaze estimation, in accordance with one embodiment.

FIG. 9 illustrates an exemplary system for gaze estimation, according to one embodiment. As shown in FIG. 9, the gaze tracking system 900 includes one or more image sensors 902, a memory 904, a processor 906, and a CNN 908. In one embodiment, each image sensor 902 may be coupled with a lens and/or other electronics in a camera assembly and configured to capture images and store images in an image format (e.g., RGB) to the memory 904. The processor 906 may read the captured images from the memory 904 and may process the images. In another embodiment, the processor 906 may analyze the captured image to estimate a head orientation of a subject in the image. For example, conventional image analysis techniques may be used to estimate how a head is oriented relative to an axis associated with the image sensor. In another embodiment, an inertial sensor mounted on to the subject's head may be used to compute the head's orientation.

In one embodiment, the orientation of the subject's head may be given in terms of pitch, yaw, and roll relative to an axis normal to the surface of the image sensor or any other appropriately defined co-ordinate system. The image may be normalized to correct for roll by performing an affine transformation of the image to align the locations of the subject's eyes relative to a horizontal axis. The image may further be warped via perspective projection to be from the viewpoint of a camera that looks directly at the center of the face or eye. The subject's head orientation may then be represented using a yaw component ($\theta$) and a pitch component ($\Phi$). The yaw component indicates to what degree the subject's head is tilted left or right with respect to one or more image sensors 902, and the pitch component indicates to what degree the subject's head is tilted up or down with respect to one or more image sensors 902. The normalized image may then be further cropped to generate an eye patch (i.e., a cropped image of the subject's eye). The eye patch along with the head orientation vector (i.e., $<\theta, \Phi>$) may be provided as input to the CNN 908 to generate an estimated gaze vector.

Classifier Architecture

Figure 10:
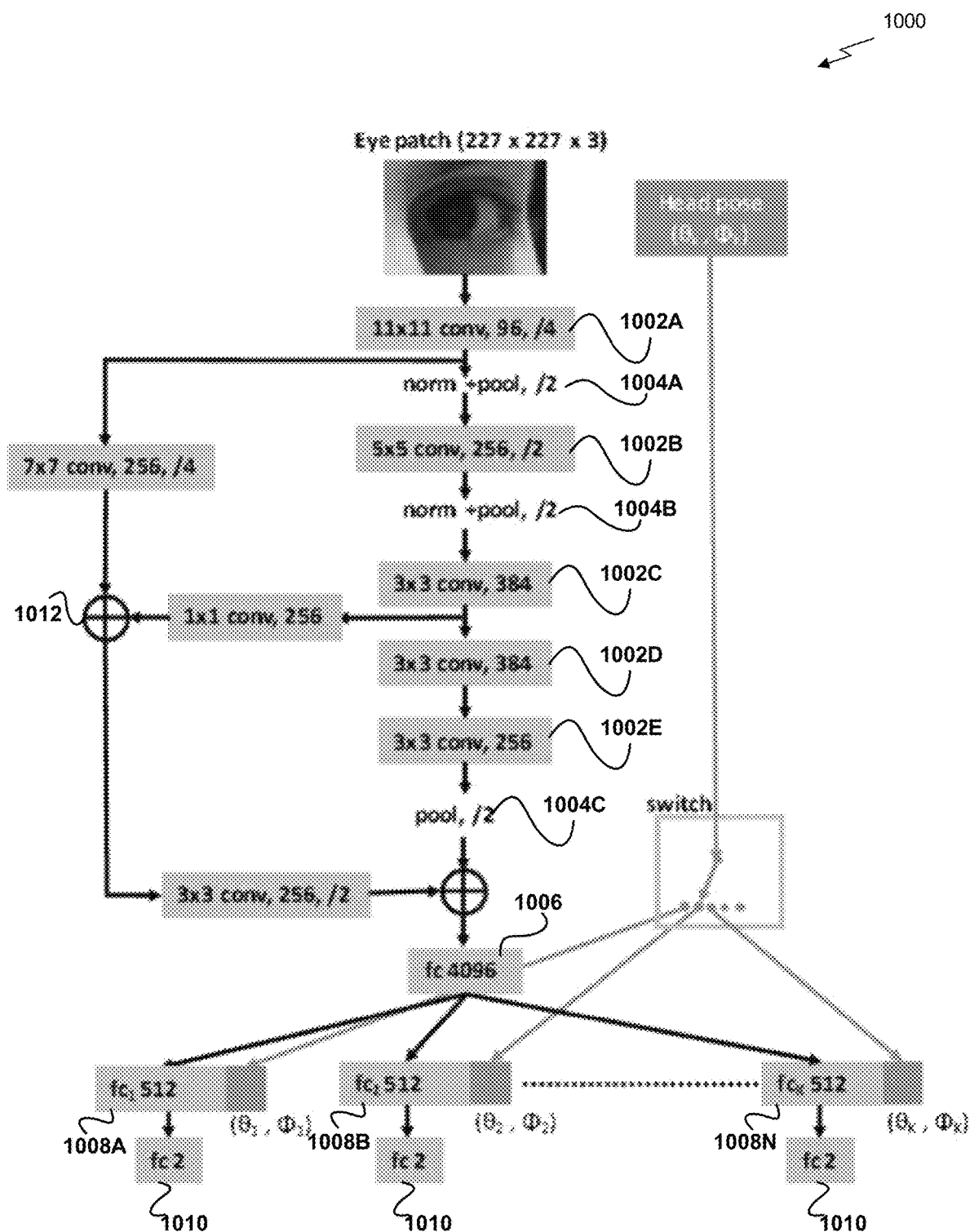
FIG. 10 illustrates an exemplary CNN, in accordance with one embodiment.

FIG. 10 illustrates an exemplary CNN 1000, according to one embodiment. As shown in FIG. 10, a CNN 1000 includes five convolution layers 1002A-E, where the first, second and fifth layers 1002A, B, and E are followed by max pooling layers 1004A-C, and a first fully connected layer 1006. Additionally, multiple additional fully connected layers 1008A-N are implemented after the first fully connected layer 1006, where each additional fully connected layer 1008A-N is associated with a particular head orientation cluster. As used herein, a head orientation cluster refers to a cluster of similar head orientations.

In one embodiment, the azimuth and elevation angles (specified in radians) for head orientation may be concatenated to the 512 features in the respective layers 1008A-N for the various pose clusters, which may result in a vector of length 514. This vector may be input to the final output layer 1010 of the CNN 1000, which may produce the azimuth and elevation angles (in radians) for the gaze vector. Residual skip connections 1012 may also be implemented for the classifier to have easy access to the lower level features of the network. The rectified Linear Unit (ReLU) may be used as the activation function after all convolution and fully connected layers. In another embodiment, the annotations in each box within the CNN 1000 may represent in order—the filter kernel sizes, the CNN layer type, the number of output feature maps, and the stride.

Head-Pose Dependence

In one embodiment, estimating the gaze orientation based on an eye patch may be more accurate for groups of similar head orientations. In other words, the CNN may produce improved results if a head orientation is fixed within some relatively small bounds. However, in the real-world, head orientation is unconstrained and, therefore, the CNN may be designed to compensate for head orientation without losing accuracy.

For example, head orientation may cause significant change in the appearance of eye images. Training a gaze network to be invariant to head pose may be performed in response to this. In one embodiment, it may be easier for appearance-based algorithms to regress over the gaze angles when the eye images have more limited head poses. This improvement may be due to a decrease in variation in the appearance of eye images for limiting head poses, and a limitation of a distribution of gaze angles, which may ease the workload of the network.

In one embodiment, a network may be trained specific to a group of head poses with small variations. For example, the head pose vectors of the training data may be clustered into K groups using k-means clustering and cosine distance. The value of K may be chosen by cross-validation and may depend on the distribution of head pose in the data. In one embodiment, the distribution of gaze angles may be dependent on the head pose.

Additionally, in one embodiment, weight-sharing may be implemented among the CNNs of the different head pose clusters. For example, the lower level layers (conv1 to fc6) may be kept common for all the head-pose clusters, but separate fc7 and fc8 layers may be used for each of them. This may ensure that low level generic features are the same for all the clusters, while head-pose-dependent features are learned separately for each of the head pose clusters in the last two fully-connected layers.

In this way, the head orientation vector may be utilized to activate different paths within the CNN that are designed for different head orientation clusters. This CNN architecture may save space by not requiring different full CNNs to be created for every head orientation cluster, but by sharing the convolution layers and pooling layer between all head orientation clusters and only separating the final fully-connected layers to perform the final classification to generate the estimated gaze vector. Sharing the convolution layers may prevent the system from having to reload and initialize different CNNs for each eye patch that is analyzed, which may save memory bandwidth and compute resources in a processor or processors tasked with implementing the CNNs.

Choice of Pre-Trained Model

In one embodiment, initializing a CNN from a pre-trained model for training may improve the overall performance of the CNN. In one embodiment, the CNN may be initialized with the weights from another model (e.g., a model which is trained for estimating the viewpoints of generic objects, etc.). This network may be originally trained for the task of joint object detection and viewpoint estimation using a large corpus of synthetically rendered images of different object categories. Using the weights from this network to initialize the weights of the current gaze-estimation CNN may result in improved accuracy.

Skip Connections

For the task of gaze estimation, a subtle change in the relative position of the eyeball with respect to the sclera may cause considerable change in the gaze value. In such cases, pooling operations, which may make the features invariant to local translation and small geometric transformations, may not be used. Moreover, the lower layer features may be rich in semantics that improve a characterization of the local transformations. To use the features from the lower layers of the CNN without any pooling operation, skip connections may be added in the network.

Skip connections may include shortcuts added to the network such that information passes through a less non-linear path. For example, convolution layers conv1a and conv3a may be added to both conv1 and conv3 respectively such that their output feature maps have a consistent dimension of 13×13×256. Element-wise addition of these features may be performed. The features may be added to the pool5 layer after a 3×3 convolution operation. In this way, the network may have a path from the input to the output that does not involve any pooling operation. The features thus obtained may be discriminative due to the network depth, and may also be rich in semantics due to easy access to the low-level features through skip connections.

Synthetic Dataset

In one embodiment, a dataset of high-quality photo-realistic synthetic images may be created (e.g., using a model containing high-quality 3D scans of human head models and detached eyeball models, which can be posed independently of the head models, etc.). In another embodiment, the subjects' eyelids may be posed in synchrony with the up/down movement of the eyeball. Color images of eyes may be rendered using ray tracing and sub-surface scattering on a graphics processing unit.

In yet another embodiment, the head yaw and pitch angles of the images may be uniformly distributed in the range of $[-60; 60]°$. The eyeball's pitch and yaw rotations may be uniformly distributed within the ranges of $[-25; 25]°$ and $[-35; 35]°$, respectively, about each head pose. The images may contain wide variations in illumination, which may be achieved by image-based relighting with different environment maps.

Figure 11:
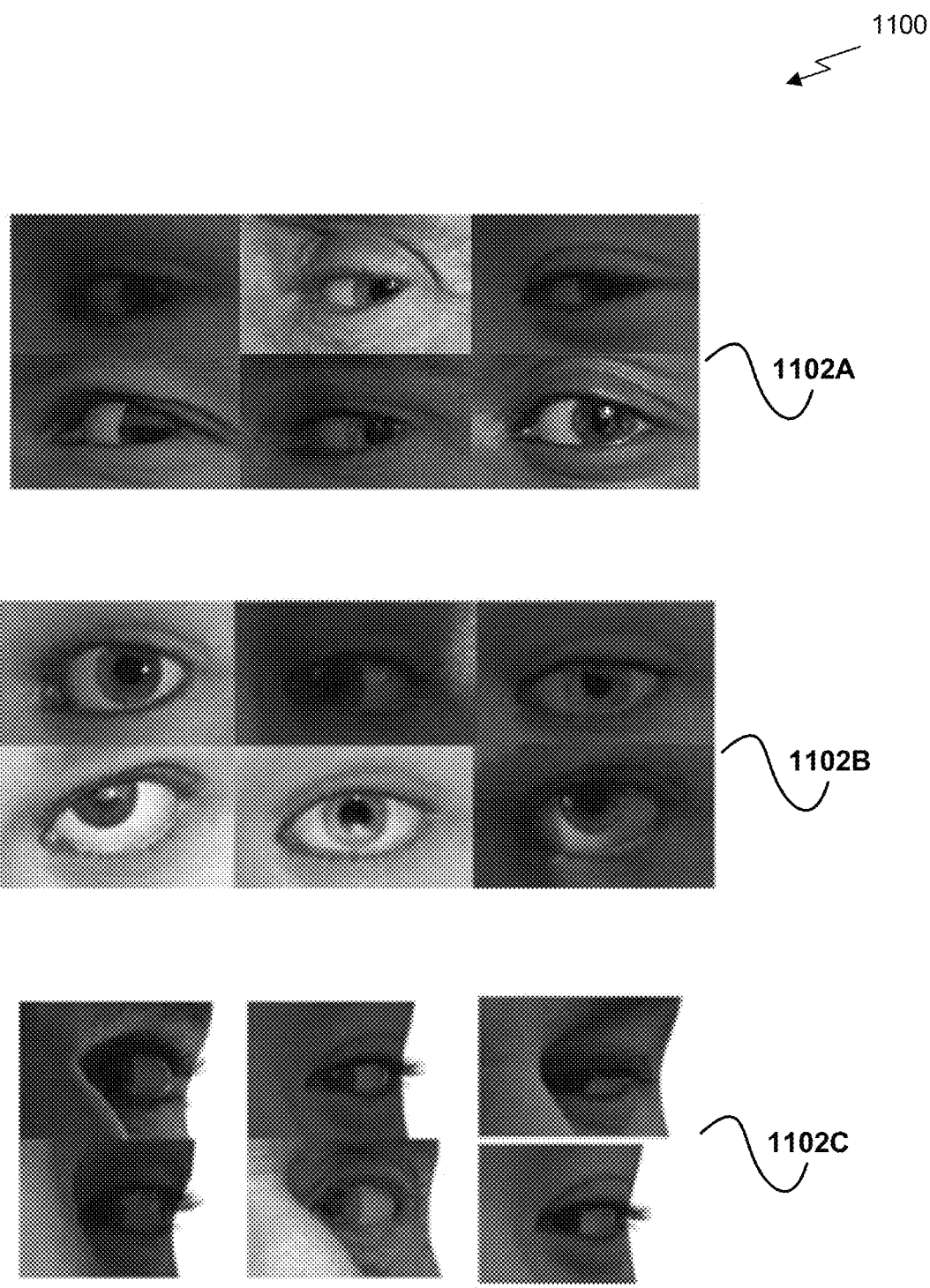
FIG. 11 illustrates various examples of rendered eye patches generated as part of a training dataset, in accordance with one embodiment.

FIG. 11 shows various examples 1102A-C of rendered eye patches generated as part of the training dataset, according to one embodiment.

Synthetic Data Targeting

The presence of differences in the prior distributions of gaze and head-pose of the training and test datasets may play a key role in determining the performance of the network. If a target distribution is known, the training set may be re-sampled such that its distribution matches that of the test set. This may result in improved performance in cross-dataset evaluation. This technique of targeting the synthetic dataset to match the distributions of the real-world datasets may be more effective. For example, to re-sample the synthetic training data, 4-dimensional histograms may be created of the synthetic and target test dataset's gaze yaw, gaze pitch, head pose yaw, and head pose pitch values with identical bin centers and bin widths of 2. Since the synthetic data may have a uniform distribution, its probability values for each bin may be multiplied with the target distribution. Then a smaller number of synthetic images may be randomly sampled for each bin, such that its overall pdf may resemble that of the target dataset.

Effects of Head Pose

In one embodiment, providing head pose as input to the CNN, in addition to an eye image, may increase the accuracy of gaze estimation. In another embodiment, separating out the higher level fc7 and fc8 layers into multiple branches for different input head poses, may result in a reduction of the angular error. In yet another embodiment, the addition of skip connections to the CNN with head-separated layers, may reduce a gaze error of the CNN.

In this way, the proposed network design may be computationally efficient in that it may re-use the low-level CNN features for all head pose branches, and may learn different separation boundaries for the various head poses in the high level semantic feature space. This architecture may also be desirable for the purposes of training CNNs, versus using multiple different networks for the various head pose clusters. The network data from all head pose clusters may be available to learn the weights of the lower-level convolutional and fully-connected layers of the network.

Conclusion

In one embodiment, a gaze tracker may use a CNN to infer a gaze direction from an image of the eye. The inputs to the CNN may include an orientation of a head and a color/intensity image of an eye. In another embodiment, to initialize a training procedure for the CNN, a pre-trained CNN may be used that was originally trained for a task of object pose estimation using a corpus of synthetically rendered images. In yet another embodiment, an architecture may be developed for the CNN which may bifurcate in the final predictive layers to specialize in a task of gaze prediction for images of the eye captured under different head poses. This architecture may increase an accuracy of the CNN. In still another embodiment, an algorithm may be developed using a CNN for detecting fiducial points along a boundary of an eye, iris, and pupil, where the CNN may be trained using only synthetically generated data.

Within the category of algorithms that employ an eye image and head pose as input, an algorithm for appearance-based gaze estimation maybe implemented that improves upon accuracy of current implementations. A more accurate pose-dependent CNN architecture may be implemented for gaze estimation. Additionally, a database of high-quality synthetically rendered images may be implemented. Further, an effective pre-training methodology for using synthetic data may be used to improve the accuracy of gaze estimation on real-world data. In one embodiment, the pose-dependent CNN architecture may be extended to full-face-based gaze estimation methods as well. In another embodiment, adversarial CNN training may be used to adapt the domain of the synthetic data to various real-world datasets. In yet another embodiment, greater subject variability may be included in the synthetic dataset.

The technology disclosed above may be unconstrained, head pose and subject-independent, and calibration free. It may use image captured with many different (and inexpensive) image sensors, and may be implemented in bright sunlight, in cars, outdoors, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   identifying an image of a head of a subject, the image of the head including an image of a face of the subject and the image of the head captured using an image sensor;
   determining, from the image of the head of the head of the subject, an orientation of the head relative to an axis normal to the surface of the image sensor, the orientation of the head represented using a roll component;
   normalizing the image of the head of the subject including:
      correcting for roll by performing an affine transformation of the image of the head to align locations of eyes of the subject relative to a horizontal axis, and
      warping the image of the head of the subject via perspective projection to be from a viewpoint of a normalized camera that looks directly at a center of the face of the subject;
   identifying a head orientation from the normalized image, including yaw and pitch values of the head of the subject with respect to the normalized camera;
   identifying, from the image of the face of the subject, an image of an eye of the subject;
   inputting, to a convolutional neural network (CNN), the image of the eye and the head orientation, the CNN having different paths for different head orientation clusters;
   determining a gaze direction for the eye with respect to the head or the normalized camera by analyzing, within one of the different paths of CNN associated with the head orientation, the image of the eye and the head orientation; and
   returning the gaze direction for the eye.

2. The method of claim 1, wherein the image of the face is captured using ambient or infra-red light.

3. The method of claim 1, wherein the gaze direction for the eye is determined with respect to the normalized camera.

4. The method of claim 1, wherein the head orientation includes a vector that indicates an azimuth value representing the yaw value and an elevation value representing the pitch value.

5. The method of claim 1, wherein the gaze direction for the eye includes a vector that indicates an azimuth value representing a yaw rotation of the eye with respect to the normalized camera and an elevation value representing a pitch rotation of the eye with respect to the normalized camera.

6. The method of claim 1, wherein the CNN implements one or more skip connections that allow a bypassing of one or more layers of the CNN during data transfer.

7. The method of claim 1, wherein the head orientation is classified into one of the different head orientation clusters.

8. The method of claim 1, wherein the CNN is initialized with weights from a related task during pre-training instead of using random values.

9. The method of claim 1, wherein the CNN is trained using 3D rendered graphical data.

10. The method of claim 1, wherein the CNN is first initialized with one or more weights, is then trained using synthetic data, and is then trained with real data.

11. The method of claim 1, wherein the CNN is trained using 3D rendered graphical data, and fiducial point estimation is performed by annotating one or more points within the 3D rendered graphical data.

12. The method of claim 1, wherein the CNN is trained using 3D rendered graphical data, and image segmentation is performed by segmenting the 3D rendered graphical data into one or more regions.

13. The method of claim 1, wherein the gaze direction for the eye is returned to a foveated rendering application.

14. A system comprising:
   a processor that is configured to:
   identify an image of a head of a subject, the image of the head including an image of a face of the subject and the image of the head captured using an image sensor;
   determine, from the image of the head of the head of the subject, an orientation of the head relative to an axis normal to the surface of the image sensor, the orientation of the head represented using a roll component;
   normalize the image of the head of the subject including:
      correcting for roll by performing an affine transformation of the image of the head to align locations of eyes of the subject relative to a horizontal axis, and
      warping the image of the head of the subject via perspective projection to be from a viewpoint of a normalized camera that looks directly at a center of the face of the subject;
   identify a head orientation from the normalized image, including yaw and pitch values of the head of the subject with respect to the normalized camera;
   identify, from the image of the face of the subject, an image of an eye of the subject;
   input, to a convolutional neural network (CNN), the image of the eye and the head orientation, the CNN having different paths for different head orientation clusters;
   determine a gaze direction for the eye with respect to the head or the normalized camera by analyzing, within one of the different paths of CNN associated with the head orientation, the image of the eye and the head orientation; and
   return the gaze direction for the eye.

15. The system of claim 14, wherein the image of the face is captured using ambient or infra-red light.

16. The system of claim 14, wherein the gaze direction for the eye is determined with respect to the normalized camera.

17. A non-transitory computer-readable storage medium storing instructions that, when executed by a processor, causes the processor to perform steps comprising:
identifying an image of a head of a subject, the image of the head including an image of a face of the subject and the image of the head captured using an image sensor;
determining, from the image of the head of the head of the subject, an orientation of the head relative to an axis normal to the surface of the image sensor, the orientation of the head represented using a roll component;
normalizing the image of the head of the subject including:
correcting for roll by performing an affine transformation of the image of the head to align locations of eyes of the subject relative to a horizontal axis, and
warping the image of the head of the subject via perspective projection to be from a viewpoint of a normalized camera that looks directly at a center of the face of the subject;
identifying a head orientation from the normalized image, including yaw and pitch values of the head of the subject with respect to the normalized camera;
identifying, from the image of the face of the subject, an image of an eye of the subject;
inputting, to a convolutional neural network (CNN), the image of the eye and the head orientation, the CNN having different paths for different head orientation clusters;
determining a gaze direction for the eye with respect to the head or the normalized camera by analyzing, within one of the different paths of CNN associated with the head orientation, the image of the eye and the head orientation; and
returning the gaze direction for the eye.

18. The method of claim 1, wherein the CNN is a head-pose dependent CNN sharing convolution layers and a pooling layer between all of the different head orientation clusters and separating the final fully-connected layers by head orientation to perform a final classification to generate the gaze direction for the eye.

19. The method of claim 1, wherein weights of the CNN are initialized using weights from another network trained for estimating viewpoints of generic objects using synthetically rendered images of different object categories.

* * * * *